(12) United States Patent
Kaihara et al.

(10) Patent No.: US 10,889,277 B2
(45) Date of Patent: Jan. 12, 2021

(54) BRAKING CONTROL DEVICE FOR VEHICLE

(71) Applicant: Mazda Motor Corporation, Hiroshima (JP)

(72) Inventors: Shinichi Kaihara, Hiroshima (JP); Hirotaka Mochizuki, Hiroshima (JP); Noboru Kyuto, Hiroshima (JP); Katsuhisa Imai, Hiroshima (JP); Kazuhiro Takemura, Hiroshima (JP); Naoki Yamada, Hiroshima (JP); Yuta Tango, Hiroshima (JP); Takanobu Kamura, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 217 days.

(21) Appl. No.: 16/019,545

(22) Filed: Jun. 27, 2018

(65) Prior Publication Data

US 2019/0061722 A1 Feb. 28, 2019

(30) Foreign Application Priority Data

Aug. 23, 2017 (JP) ................. 2017-159951

(51) Int. Cl.
*B60T 8/40* (2006.01)
*B60T 8/17* (2006.01)
*B60T 8/32* (2006.01)

(52) U.S. Cl.
CPC ............. *B60T 8/4081* (2013.01); *B60T 8/17* (2013.01); *B60T 8/326* (2013.01); *B60T 8/409* (2013.01); *B60T 2270/82* (2013.01)

(58) Field of Classification Search
CPC .......... B60T 8/4081; B60T 8/17; B60T 8/326; B60T 8/409; B60T 2270/82
See application file for complete search history.

(56) References Cited

U.S. PATENT DOCUMENTS

| | | | |
|---|---|---|---|
| 2004/0183369 A1* | 9/2004 | Soga | B60T 8/4081 303/113.4 |
| 2004/0183370 A1* | 9/2004 | Kusano | B60T 8/441 303/114.1 |

(Continued)

FOREIGN PATENT DOCUMENTS

| | | |
|---|---|---|
| JP | 2006281872 A | 10/2006 |
| JP | 2009292209 A | 12/2009 |

*Primary Examiner* — Yazan A Soofi
*Assistant Examiner* — Naeem Taslim Alam
(74) *Attorney, Agent, or Firm* — Alleman Hall Creasman & Tuttle LLP

(57) ABSTRACT

A braking control device for a vehicle is provided, which includes an operating amount detecting part configured to detect an operating amount of a brake pedal, a reaction-force giving part configured to generate a reaction force of the brake pedal, a braking-force generating part configured to generate a braking force for wheels according to the brake pedal operating amount, and an electronic control unit (ECU) electrically connected with them. The ECU includes a processor configured to control the giving part and generating part, and set a braking rigidity characteristic based on a braking rigidity that is a ratio of the reaction force to the operating amount, and a vehicle deceleration. The ECU sets a braking rigidity value so that the braking rigidity value increases as the vehicle deceleration becomes larger. The ECU controls the reaction-force giving part based on the braking rigidity value.

8 Claims, 5 Drawing Sheets

(56) References Cited

U.S. PATENT DOCUMENTS

| | | | |
|---|---|---|---|
| 2007/0159001 A1* | 7/2007 | Miyazaki | B60T 8/3275 |
| | | | 303/113.4 |
| 2010/0064842 A1* | 3/2010 | Isono | G05G 1/38 |
| | | | 74/512 |
| 2010/0070252 A1* | 3/2010 | Isono | B60T 7/042 |
| | | | 703/7 |
| 2011/0202250 A1* | 8/2011 | Miyajima | B60T 7/06 |
| | | | 701/70 |
| 2012/0240717 A1* | 9/2012 | Isono | B60T 11/18 |
| | | | 74/520 |
| 2013/0269338 A1* | 10/2013 | Isono | B60T 7/042 |
| | | | 60/563 |
| 2016/0016568 A1* | 1/2016 | Ishida | B60T 8/409 |
| | | | 303/15 |
| 2017/0036659 A1* | 2/2017 | Murakami | B60T 13/662 |
| 2018/0105156 A1* | 4/2018 | Kishi | B60T 8/4077 |
| 2020/0023817 A1* | 1/2020 | O'Meachair | B60L 15/2009 |

* cited by examiner

BRAKING CONTROL DEVICE FOR VEHICLE

TECHNICAL FIELD

The present disclosure relates to a braking control device for a vehicle, and particularly to the braking control device provided with a reaction-force giving part which generates a reaction force based on an operating amount of a brake pedal and a braking-force generating part which generates a braking force for wheels.

BACKGROUND OF THE DISCLOSURE

Conventionally, vehicles with a by-wire system are known, which are provided with an operating mechanism operated by a vehicle operator, a reaction-force generating mechanism which gives an operational reaction force to the operating mechanism, and a driving mechanism which drives a vehicle so that the vehicle functions by a given response amount according to the operating amount to the operating mechanism. In such vehicles which adopt the by-wire system, the coupling with a mechanical mechanism between the operating mechanism and the driving mechanism is replaced with a coupling by an electrical signal so that the operating amount of the operating mechanism by the vehicle operator, the amount of the reaction force to the vehicle operator, and the response amount of the vehicle are mechanically separated as independent elements.

Normally, the brake-by-wire technology separately controls an operational reaction force (stepping force) to the vehicle operator through a brake pedal, and a braking force (deceleration) of the vehicle, using a stroke of the brake pedal operated by the vehicle operator as a control parameter. In this brake-by-wire technology, a controller to integrate the entire system pre-stores a reaction-force characteristic map where a relationship between the stroke and the operational reaction force is defined, and a braking-force characteristic map where a relationship between the stroke and the braking force is defined. The controller determines the operational reaction force and the braking force, which are control targets, based on the stroke of the brake pedal detected by a stroke sensor and the respective characteristic maps, and then outputs a control signal corresponding to the determined operational reaction force and braking force to each actuator.

JP2006-281872A discloses a braking control device of the brake-by-wire system provided with a stroke detector which detects an operation stroke of a brake pedal, a brake actuator which generates a braking force of wheels, and a reaction-force giving mechanism which gives an operational reaction force of the brake pedal. When the vehicle travels at a high speed, the device sets the operational reaction force over the stroke higher to secure a rigid feel and sets the braking force over the stroke higher, compared with the braking force at a low speed. Thus, the device successfully suppresses the problem peculiar to the brake-by-wire system which is originated in holding the reaction-force characteristic map and the braking-force characteristic map, and the characteristic problem that the braking force decreases in conjunction with a so-called "rigid-feel increase."

In the stepping stroke of the brake pedal, there are a "step-on stroke" in which the vehicle operator moves their foot onto the brake pedal and eliminates (cuts) the mechanical play of the brake mechanism including the brake pedal, and an "actual stepping stroke" in which the vehicle operator intentionally starts a stepping operation of the brake pedal. During the step-on stroke, since the vehicle operator places their foot on the brake pedal, the weight of their foot cuts the play of the brake pedal and other mechanisms, and if still more mechanical play remains, the vehicle operator then performs the stepping operation for cutting the remaining play. During the actual stepping stroke, the vehicle operator anticipates a braking-controlled vehicle behavior and performs a stepping operation corresponding to an expected deceleration. Meanwhile, the operational reaction force of the brake pedal and the braking force of the vehicle are both set based on the stroke of the brake pedal operated by the vehicle operator. Therefore, there is a possibility that a deviation may arise between the operator's expected operation and the actual vehicle behavior as the stepping operation feel is changed based on the mechanical play of the brake mechanism.

Since in the braking control device of the brake-by-wire system the operating amount of the brake pedal, the amount of reaction force to the vehicle operator, and the response amount of the vehicle are configured to be separated independent elements, an establishment of matching the operating characteristic of the human component and the operating characteristic of the device component is essential for securing operability and response. Thus, like the brake device of JP2006-281872A, when the braking force of the vehicle is increased as the rigid feel comprised of the reaction force of the brake pedal and the stroke of the brake pedal becomes higher, it is possible to improve operability and response only within the actual stepping stroke within the stepping stroke of the brake pedal.

However, the operator's operating situation of the vehicle is varied, and as described above, the stepping stroke includes the step-on stroke in addition to the actual stepping stroke, as a preceding stroke. As for the operating characteristic of the device system, the step-on stroke is a period when the play of the brake mechanism is cut regardless of some existing stroke of the brake pedal, and it is also a period when the rigid feel decreases. Therefore, the rigid feel of the device system increases only after all the play is cut. For this reason, although the operator recognizes that the actual stepping stroke starts from a point of inflection where the characteristic related to the rigid feel changes from negative to positive, the vehicle starts decelerating when the stroke of the brake pedal occurs, and thereby, the operator may feel odd. Particularly, as the deceleration corresponding to the point of inflection of the characteristic related to the rigid feel increases, i.e., as the point of inflection shifts to the increased side for the deceleration, the operator's sense of the perception of the stepping is delayed regardless of the actual deceleration of the vehicle occurred, and as a result, the deviation between the operator's expected operation and the vehicle behavior increases.

SUMMARY OF THE DISCLOSURE

Therefore, one purpose of the present disclosure is to provide a braking control device for a vehicle, which can eliminate a deviation between an expected operation of a vehicle operator and behavior of the vehicle, without depending on an operating situation of a brake pedal.

According to one aspect of this disclosure, a braking control device for a vehicle is provided, which includes an operating amount detecting part configured to detect an operating amount of a brake pedal, a reaction-force giving part configured to generate a reaction force of the brake pedal, a braking-force generating part configured to generate a braking force for wheels according to the operating amount of the brake pedal, and an electronic control unit (ECU) electrically connected with the operating amount detecting part, the reaction-force giving part, and the braking-force generating part, the ECU including a processor configured to execute a control module to control the reaction-force giving part and the braking-force generating part, and a braking rigidity characteristic setting module configured to set a braking rigidity characteristic based on a braking rigidity that is a ratio of the reaction force of the brake pedal to the operating amount of the brake pedal, and a deceleration of the vehicle. The braking rigidity characteristic setting module sets a braking rigidity value so that the braking rigidity value increases as the deceleration of the vehicle becomes larger. The control module controls the reaction-force giving part based on the braking rigidity characteristic.

Since this braking control device includes the braking rigidity characteristic setting module which sets the braking rigidity characteristic based on the braking rigidity that is the ratio of the reaction force of the brake pedal to the operating amount of the brake pedal, and the deceleration of the vehicle, a correlation characteristic can be given to associate the reaction force of the brake pedal, the operating amount of the brake pedal, and the deceleration of the vehicle with each other, which are the separated independent elements. Since the control module controls the reaction-force giving part based on the braking rigidity characteristic, it is capable of suitably controlling the reaction force of the brake pedal in the state where the braking rigidity is associated with the deceleration of the vehicle, regardless of the operating situation of the brake pedal.

The braking rigidity characteristic setting part may set a local minimum point where the braking rigidity becomes the minimum within a range of near-zero deceleration, and set the reaction force so that the braking rigidity decreases as the deceleration of the vehicle becomes larger when the deceleration of the vehicle is smaller than the local minimum point. According to this configuration, a situation where a vehicle operator's perception of stepping of the brake pedal becomes slow, regardless of the deceleration occurring on the vehicle, can be avoided.

The braking rigidity characteristic setting module may set the local minimum point within a range near a minimum threshold of the deceleration that is perceivable by a vehicle operator. According to this configuration, a situation where the operator's perception of the stepping of the brake pedal becomes slow can be avoided, without needing a highly precise adjustment.

The local minimum point may be set within a deceleration range higher than a minimum threshold of the deceleration that is perceivable by a vehicle operator. According to this configuration, the vehicle operator can foresee an actual start of the stepping operation of the brake pedal upon the operation accompanied by a negative braking rigidity, while improving a braking response of the vehicle.

The braking rigidity characteristic setting module may set the braking rigidity value based on a map where a correlation between the braking rigidity value and the deceleration of the vehicle is preset. According to this configuration, the reaction-force giving part can be controlled based on the braking rigidity characteristic with a simple configuration.

DETAILED DESCRIPTION OF THE DISCLOSURE

Hereinafter, one embodiment of the present disclosure is described in detail based on the accompanying drawings. The following description merely illustrates the present disclosure being applied to a braking control device for a vehicle, and thus, this description is not to limit the present disclosure, its applications, and its use.

Figure 1:
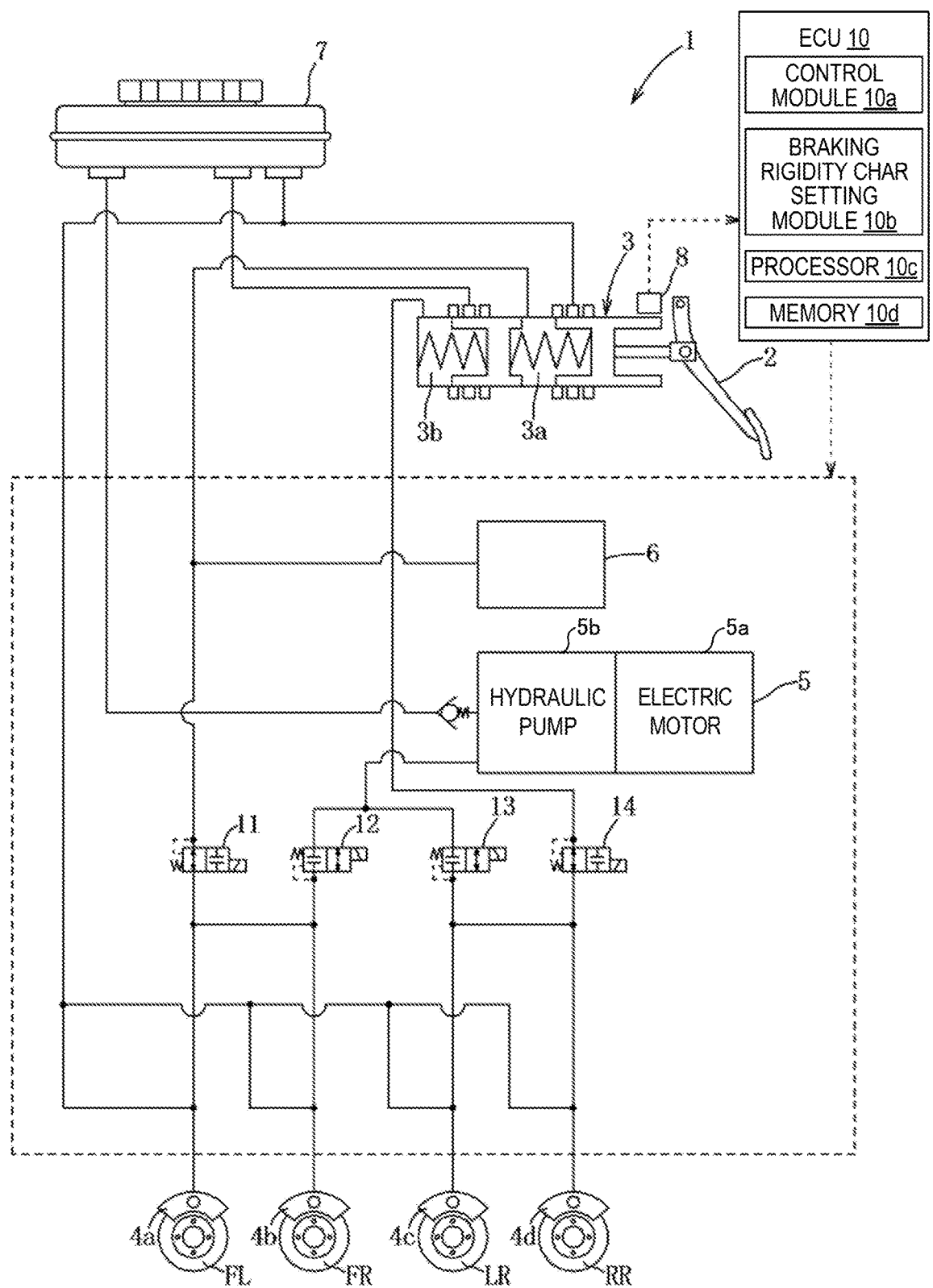
FIG. 1 is a view schematically illustrating a configuration of a braking control device for a vehicle according to one embodiment of the present disclosure.

Below, one embodiment of the present disclosure is described based on FIGS. 1 to 5. As illustrated in FIG. 1, a braking control device 1 constitutes a brake-by-wire mechanism, and includes a master cylinder 3 capable of generating brake hydraulic pressure corresponding to a stroke (stepping state) of a brake pedal 2, and a braking hydraulic pressure generating mechanism 5 (braking-force generating part) capable of supplying brake hydraulic pressure to wheel cylinders 4a-4d which respectively brake the rotations of front and rear, and left and right wheels FL, FR, RL, and RR of a vehicle. The device 1 is configured so that, when the braking hydraulic pressure generating mechanism 5 is normal, the brake hydraulic pressure which is doubled pressure (e.g., more than doubled) of operation of the brake pedal 2 is supplied from the braking hydraulic pressure generating mechanism 5 to the respective wheel cylinders 4a-4d, and when the braking hydraulic pressure generating mechanism 5 is abnormal, the brake hydraulic pressure which is equal to the operation of the brake pedal 2 is supplied from the master cylinder 3 to the respective wheel cylinders 4a-4d. Note that the device 1 is also provided with a reaction-force giving part 6 which causes the brake pedal 2 to generate a reaction force corresponding to a stroke of the brake pedal 2 when the braking hydraulic pressure generating mechanism 5 is normal.

First, the master cylinder 3 is described. The master cylinder 3 includes a first pressure generating chamber 3a and a second pressure generating chamber 3b. The first and second pressure generating chambers 3a and 3b are connected with a reservoir tank 7, and are provided therein with a compression spring, respectively. These first and second pressure generating chambers 3a and 3b are configured to pump substantially similar brake hydraulic pressures corresponding to a stepping operation of the brake pedal 2. The first pressure generating chamber 3a communicates with the wheel cylinders 4a and 4b through an electromagnetic valve 11 which can be opened and closed, and the second pressure generating chamber 3b communicates with the wheel cylinders 4c and 4d through an electromagnetic valve 14 which can be opened and closed. The electromagnetic valves 11 and 14 are closed when given current, while they are not given the current to be opened when the braking hydraulic pressure generating mechanism 5 is abnormal.

Next, the braking hydraulic pressure generating mechanism 5 is described. The braking hydraulic pressure generating mechanism 5 is connected with the reservoir tank 7, and is comprised of an electric motor 5a, a hydraulic pump 5b, etc. This braking hydraulic pressure generating mechanism 5 communicates with the wheel cylinders 4a and 4b through an electromagnetic valve 12 which can be opened and closed, and communicates with the wheel cylinders 4c and 4d through an electromagnetic valve 13 which can be opened and closed. The electromagnetic valves 12 and 13 are opened when given the current.

As illustrated in FIG. 1, when the electromagnetic valves 11 and 14 are opened and the electromagnetic valves 12 and 13 are closed, the brake hydraulic pressure is directly supplied from the master cylinder 3 to the respective wheel cylinders 4a-4d, and when the electromagnetic valves 11 and 14 are closed and the electromagnetic valves 12 and 13 are opened, the brake hydraulic pressure is supplied from the braking hydraulic pressure generating mechanism 5 to the respective wheel cylinders 4a-4d. A return channel to return the brake hydraulic pressure to the reservoir tank 7 is provided to a channel upstream of each of the wheel cylinders 4a-4d.

Next, the reaction-force giving part 6 is described. The reaction-force giving part 6 is comprised of a stroke simulator which simulates the consumption of oil, and is capable of absorbing and consuming the brake hydraulic pressure pumped from the master cylinder 3. This reaction-force giving part 6 is connected with a channel which communicates the first pressure generating chamber 3a with the electromagnetic valve 11, and is comprised of, for example, a cylinder, a piston which is slidable inside the cylinder, a biasing element which biases the piston, etc. Thus, when a vehicle operator steps on or releases the brake pedal 2, a reaction force (stepping force) with a preset characteristic can be acted on the operator through the brake pedal 2. Note that since the reaction force which acts from the brake pedal 2 on the operator's foot and the stepping force required for the operator to operate the brake pedal 2 are in a relationship of action and reaction, their expressions are unified into the reaction force in the following description.

The brake pedal 2 is provided with a stroke sensor 8 (operating amount detecting part) which detects a pedal stroke operating amount St (hereinafter, may be abbreviated as "stroke") which is an amount of stepping or releasing operation of the brake pedal 2 by the operator. The operator's stroke St detected by the stroke sensor 8 is outputted to an ECU (Electronic Control Unit) 10 (controller) as a detection signal.

Next, the ECU 10 is described. The ECU 10 is comprised of a control module 10a, a braking rigidity characteristic setting module 10b, a processor 10c (i.e., a CPU (Central Processing Unit)), memory 10d (i.e., ROM and RAM), an IN-side interface, an OUT-side interface, etc. The ROM stores various programs, data, and maps for controlling the reaction force and the braking force, and the RAM is provided with a processing area used by the processor 10c to perform a series of processings. The processor 10c is configured to execute the control module 10a and the braking rigidity characteristic setting module 10b to perform their respective functions. Each module is stored in the memory 10d as software. The ECU 10 is electrically connected with the braking hydraulic pressure generating mechanism 5, the reaction-force giving part 6, the stroke sensor 8, and the electromagnetic valves 11-14, and is configured to execute deceleration control processing and reaction-force control processing.

Figure 2:
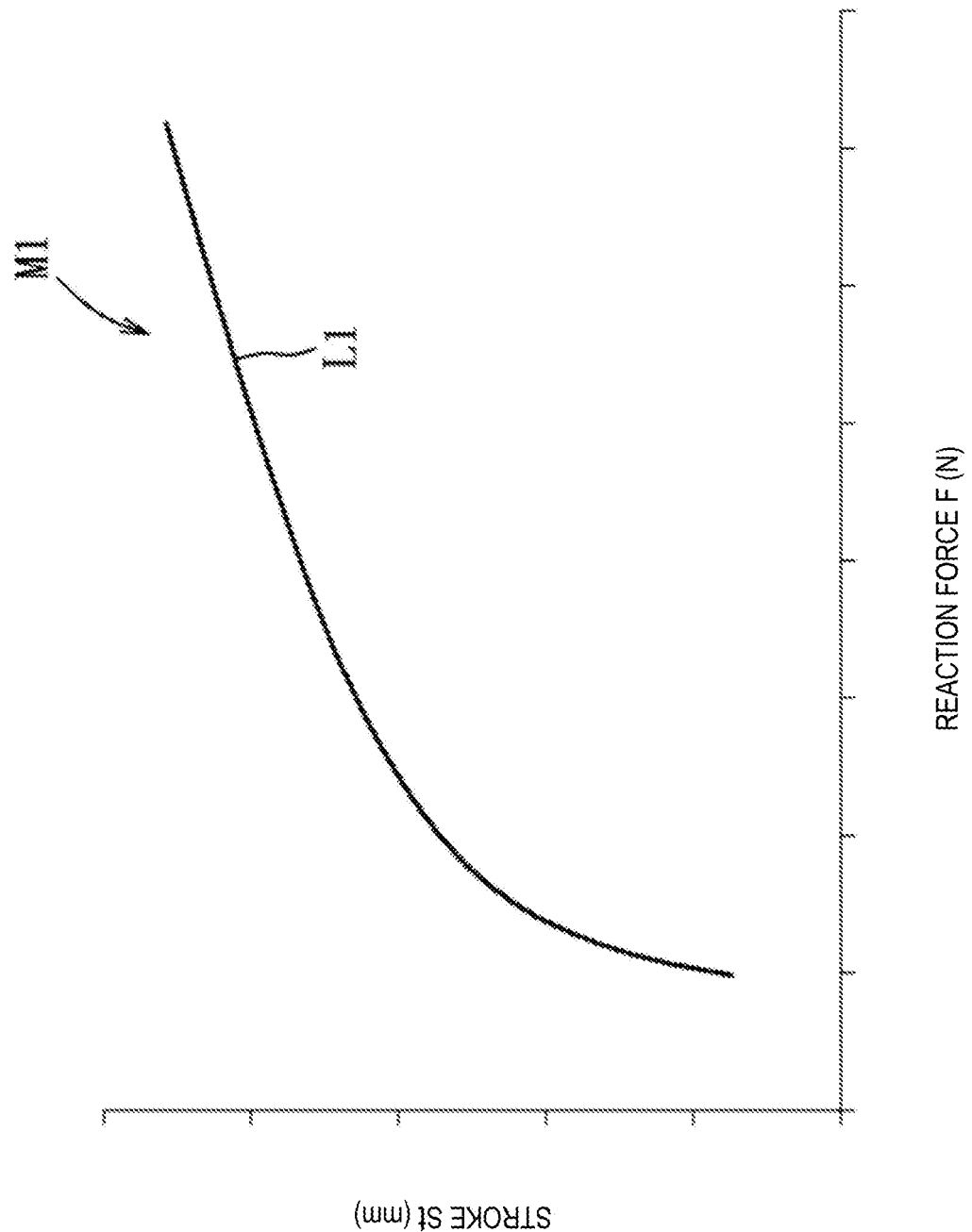
FIG. 2 is a map of a reaction-force characteristic illustrating by a graph of a relationship between a stroke and a reaction force.

First, the deceleration control processing is described. As illustrated in FIG. 2, the ECU 10 has a reaction-force characteristic map M1 stored in the memory 10d. As illustrated in the following formula (1), the operator's perception of sensation (sensitivity) is proportional to the logarithm of stimulus intensity (Weber-Fechner's law). Here, A is an amount of perception, B is a physical quantity of stimuli, k is a gain, and K is a constant of integration.

$$A = k \log B + K \qquad (1)$$

Therefore, a reaction-force characteristic L1 in which a reaction force F by which the operator operates the brake pedal 2 and the stroke St of the brake pedal 2 become the logarithmic relationship is preset in the reaction-force characteristic map M1. The ECU 10 sets the reaction force F which is to be an initial value based on the stroke St detected by the stroke sensor 8 and the reaction-force characteristic map M1. Thus, the relationship between the reaction force F of the brake pedal 2 (operating force) which the operator perceives and the stroke St of the brake pedal 2 can be linear in terms of a human's perception characteristic to avoid a deviation between the amount of perception which the operator senses through their somatic sensation, and the physical operating amount by which the brake pedal 2 is operated.

Figure 3:
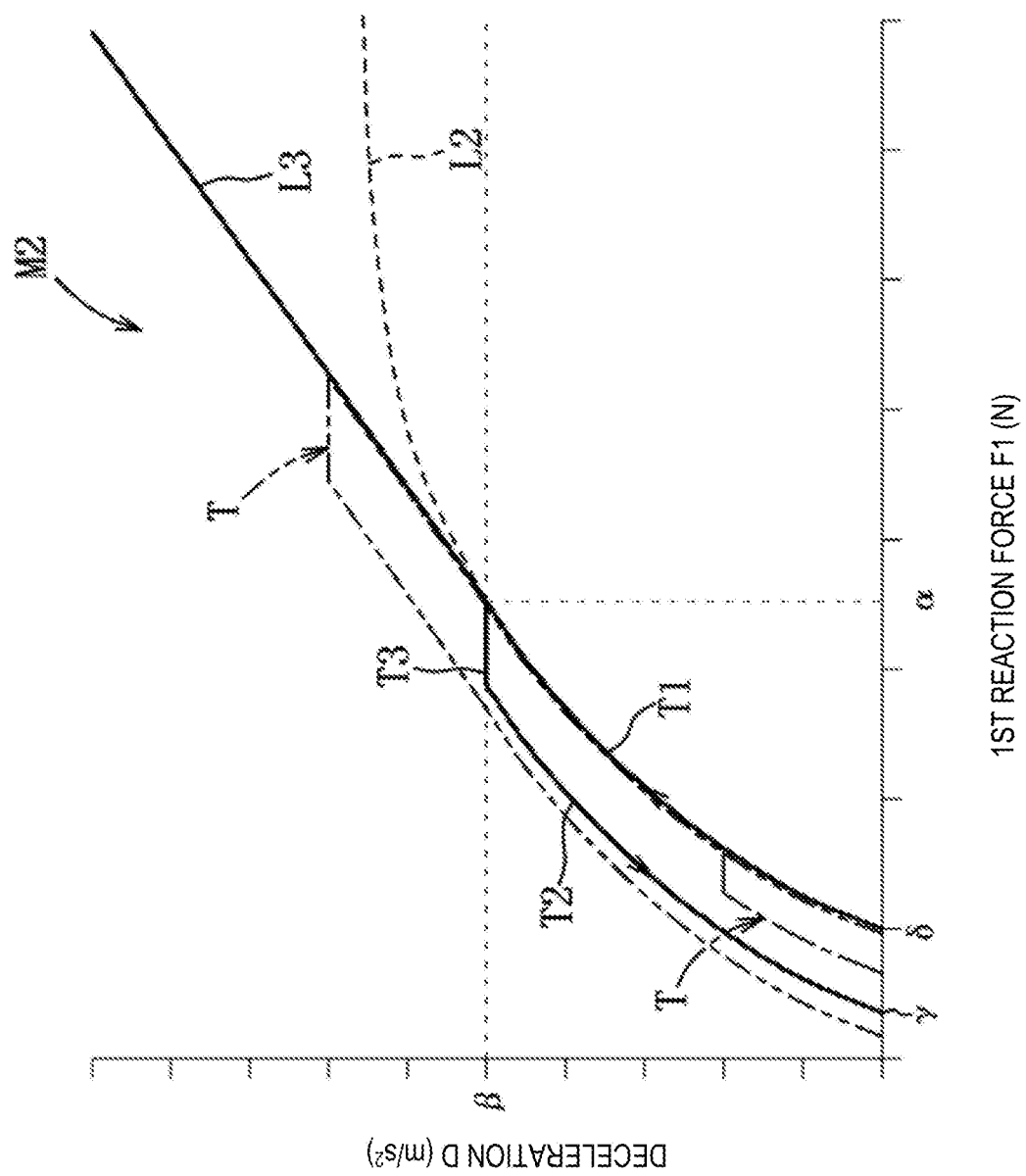
FIG. 3 is a map of a braking characteristic illustrating by a graph of a relationship between the reaction force and a deceleration.

As illustrated in FIG. 3, the ECU 10 has a braking characteristic map M2. The ECU 10 sets the reaction force F set through the detected stroke St as the first reaction force F 1, sets a deceleration D corresponding to a target deceleration of the vehicle by using the first reaction force F1 and the braking characteristic map M2, and then outputs an operating instruction signal corresponding to the deceleration D to the braking hydraulic pressure generating mechanism 5 in a state where the electromagnetic valves 11 and 14 are closed and the electromagnetic valves 12 and 13 are opened. Thus, the respective wheel cylinders 4a-4d are driven, and braking of the deceleration D based on the braking characteristic map M2 is executed.

The braking characteristic map M2 is defined by the first reaction force F1 corresponding to the operator's operating force of the brake pedal 2 and the deceleration D of the vehicle, where a braking characteristic T is set, which is comprised of a stepping characteristic T1, a releasing characteristic T2, and a hysteresis T3 corresponding to a reaction-force difference (offset) between the stepping characteristic T1 and the releasing characteristic T2 when the releasing starts. The stepping characteristic T1 is set on a characteristic L2 in which the first reaction force F1 by which the operator operates the brake pedal 2 and the deceleration D of the vehicle become in the logarithmic relationship when the first reaction force F1 is below a threshold a, and is set on a characteristic L3 which is higher than the characteristic L2 and is a linear relationship (a proportional relationship between the first reaction force F1 and the deceleration D) when the first reaction force F1 is above the threshold α. The releasing characteristic T2 is a characteristic which is obtained by offsetting the stepping characteristic T1 to a reaction-force reducing side, for example, by 15 to 20 N. In this embodiment, the characteristic L3 is formed by a tangent at coordinates ($\alpha$, $\beta$) of the characteristic L2.

The braking characteristic T can secure the linearity of the operating amount which the operator perceives (the amount of perception of the first reaction force F1) and the behavior of the vehicle (deceleration D), for example, up to the threshold $\beta$ of the deceleration D required for emergency braking (the threshold a of the first reaction force F1 corresponding to the threshold $\beta$), that is during normal traveling of the vehicle, because the first reaction force F1 and the deceleration D of the vehicle are in the logarithmic relationship, thereby a suitable operational feel can be obtained. On the other hand, since the deceleration D of the vehicle is controlled so as to increase at the emergency braking, more than the linear relationship between the operator's perceived amount of operation and the vehicle behavior, the device is capable of demonstrating the braking performance with a suitable response matching with the operator's braking demand, or a so-called "intention of rapid slowdown." As illustrated in FIG. 3, the braking characteristic T is set so that a residual reaction force γ when the deceleration D is zero in the releasing characteristic T2 is above 2 N and below 10 N. This is because sensing of the operation of the brake pedal 2 by the sole and the leg muscles is difficult if the residual reaction force γ is below 2 N, and the leg cannot sense the end of releasing of the brake pedal 2 (the deceleration D is zero) if the residual reaction force γ is above 10 N.

Moreover, as illustrated in FIG. 3, the ECU 10 sets the braking characteristic T (one-dot chain line) so that the hysteresis T3 decreases as the deceleration D at the releasing start becomes smaller, and sets the braking characteristic T (two-dot chain line) so that the hysteresis T3 increases as the deceleration D at the releasing start becomes larger. Thus, the hysteresis T3 is increased when the deceleration D is large at the releasing start where the motion is often and the functional switching period between the protagonist muscles and the antagonist muscles is long, while the hysteresis T3 is decreased when the deceleration D is small at the releasing start where the motion is not often and the functional switching period of the protagonist muscles and the antagonist muscles is short, to match the response of the vehicle behavior with the operator's muscle characteristics. The setting range of the hysteresis T3 is set above the residual reaction force γ, and below a stepping start reaction force δ when the deceleration D in the stepping characteristic T1 is zero (e.g., 30 N). That is to secure the functional switching period of the protagonist muscles and the antagonist muscles, and secure the operability of the brake pedal 2 when the deceleration D is within near-zero range.

Figure 4:
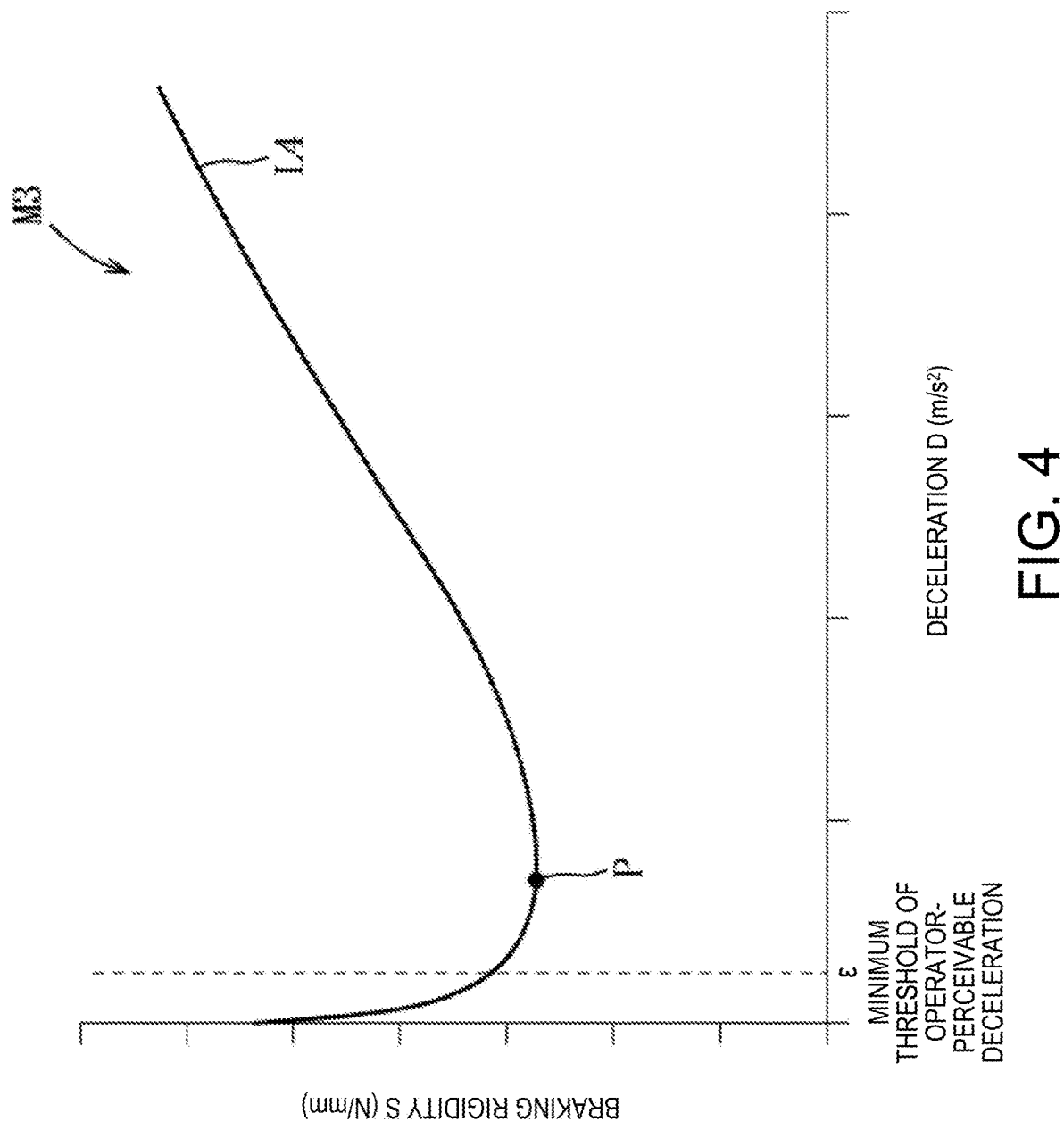
FIG. 4 is a map of a braking rigidity characteristic illustrating by a graph of a relationship between the deceleration and a braking rigidity.

Next, the reaction-force control processing is described. As illustrated in FIG. 4, the ECU 10 has a braking rigidity characteristic map M3. The ECU 10 sets a second reaction force F2 using the detected stroke St, the set deceleration D, and the braking rigidity characteristic map M3, and outputs the operating instruction signal corresponding to the second reaction force F2 to the reaction-force giving part 6. The second reaction force F2 set here is the operational reaction force which actually acts on the operator, and is the stepping force F of the operator required for the operation of the brake pedal 2. In the braking rigidity characteristic map M3, a braking rigidity characteristic L4 (e.g., a characteristic curve) is set by the deceleration D and the braking rigidity S. The braking rigidity S is calculated by substituting the second reaction force F2 of the brake pedal 2 and the stroke St of the brake pedal 2 by the operator in the following formula (2).

$$S = F2/St \qquad (2)$$

As a precondition, it is assumed that the logarithmic relationship is established between the second reaction force F2 and the deceleration D.

Figure 5:
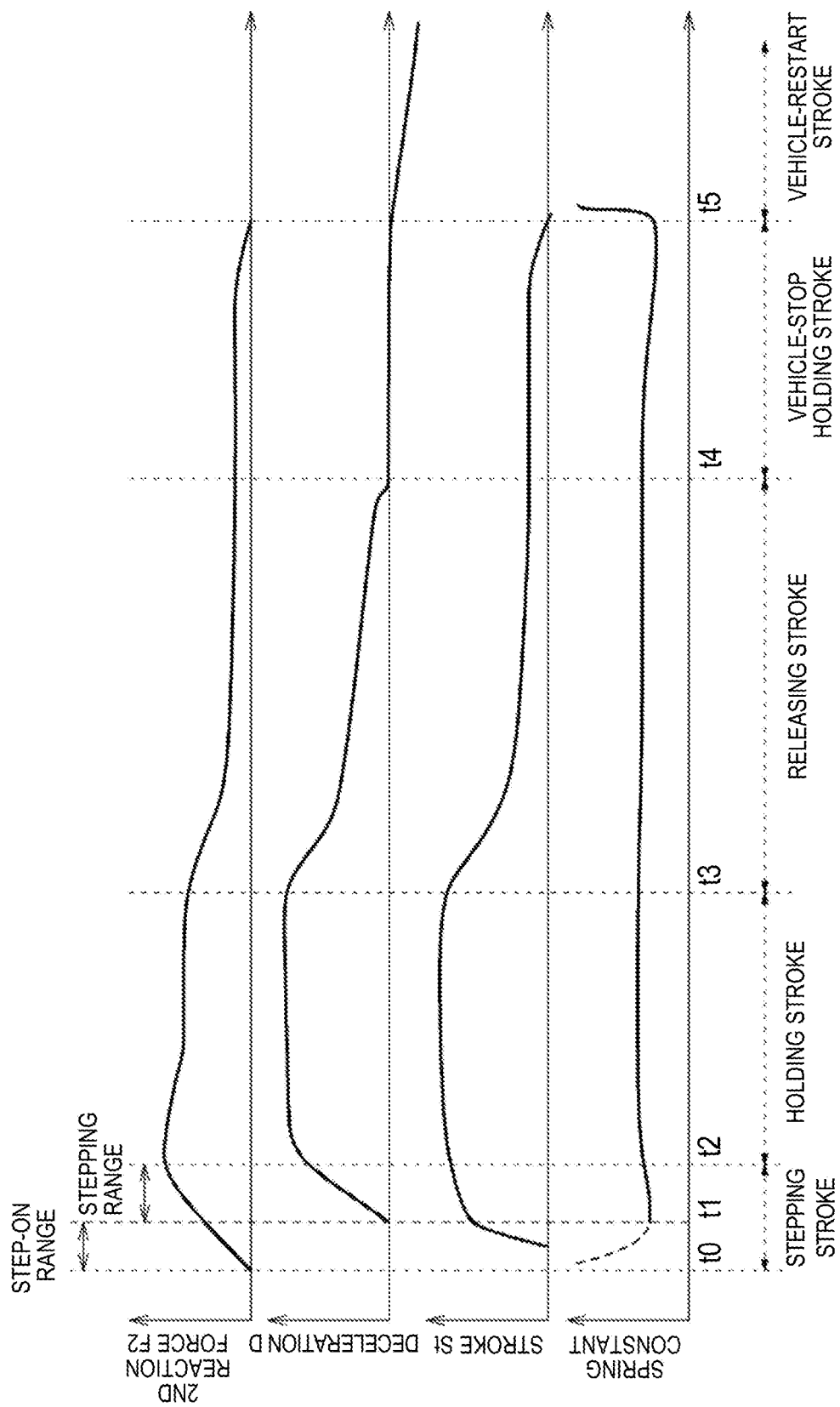
FIG. 5 is a time chart of each element when braking is applied to the vehicle.

Here, the reason for having set the braking rigidity characteristic L4 is described. Normally, as illustrated in FIG. 5, the operation of the vehicle is comprised of a stepping stroke (t0-t2) of the brake pedal 2 by the operator, a holding stroke (t2-t3) of the brake pedal 2, a releasing stroke (t3-t4) of the brake pedal 2, a vehicle-stop holding stroke (t4-t5), and a vehicle-restart stroke (t5-). Note that the spring constant represents the physical operational characteristic of the brake pedal 2. The stepping stroke is comprised of a step-on range (t0-t1) in which the mechanism play of the brake pedal 2, etc., is eliminated (cut) by the operator moving the foot onto the brake pedal 2 and operating the brake pedal 2, and a stepping range (t1-t2) in which the stepping operation is performed intentionally. In the brake-by-wire mechanism, since the matching between the end timing of the step-on range and the eliminated timing of the play (the point of inflection of the stroke St), and the matching between the start timing of the deceleration D and the eliminated timing of the play affect the operating performance of the brake pedal 2 and the braking performance of the vehicle, the second reaction force F2 is set based on the braking rigidity characteristic L4 and the stroke St, instead of using the first reaction force F1 set based on the reaction-force characteristic map M1, and the second reaction force F2 is given to the vehicle operator through the brake pedal 2.

As illustrated in FIG. 4, since the inclination characteristic of the braking rigidity S is turned from negative to positive bordering on a local minimum point P of the braking rigidity characteristic L4, the local minimum point P serves as a starting point of the operator's perception of the stepping operation of the brake pedal 2. Therefore, the operator's perception of the stepping of the brake pedal 2 becomes slower or delayed as the local minimum point P shifts to the increasing side of the deceleration D regardless of the deceleration D occurring on the vehicle in fact, and as a result, the deviation arises between the vehicle behavior and the expected operation of the brake pedal 2. For this reason, the local minimum point P is set at the deceleration D of the near-zero range in terms of operability. In this embodiment, the local minimum point P is set at the deceleration D slightly larger than a minimum threshold c of the operator-perceivable deceleration D (e.g., 0.2 to 0.5 m/s$^2$). Thus, the operator can foresee the actual start of the stepping operation of the brake pedal 2 in advance (perceivable of the elimination of the play) upon the operation accompanied by the negative braking rigidity S, while improving the braking response of the vehicle.

Moreover, the slope of the braking rigidity characteristic L4 on the increasing side from the local minimum point P is set within a range of 0.10 to 0.30 ((N/mm)/(m/s$^2$)), for example. Since the operator's stepping feel of the brake pedal 2 is small if the slope of the braking rigidity characteristic L4 is below 0.10, it is difficult for the operator to perceive the operating feel of the brake pedal 2 (strong spongy feel), and since the reaction force F required for the operation of the brake pedal 2 is high if exceeding 0.30, it is difficult for the operator to step on the brake pedal 2 (strong feel of stepping on a plate) thereby degrading the operability.

Next, operation and effects of the braking control device 1 for the vehicle are described. Since the braking control device 1 according to this embodiment has the ECU 10 which sets the braking rigidity characteristic L4 based on the braking rigidity S which is the ratio of the second reaction force F2 to the stroke St, and the deceleration D, the correlation characteristics can be given to associate the reaction force of the brake pedal 2, the stroke St of the brake pedal 2, and the deceleration D of the vehicle with each other, which are the separated independent elements. Since the ECU 10 controls the reaction-force giving part 6 based on the braking rigidity characteristic L4, it is capable of suitably controlling the second reaction force F2 of the brake pedal 2 in the state where the braking rigidity S is associated with the deceleration D of the vehicle, regardless of the operating situation of the brake pedal 2.

Since in the braking rigidity characteristic L4 the local minimum point P is set so that the braking rigidity S became the minimum within the near-zero range of the deceleration D, the situation where the operator's perception of the stepping of the brake pedal 2 becomes slow, regardless of the deceleration D occurring on the vehicle, can be avoided.

Since in the braking rigidity characteristic L4 the local minimum point is set within the range near the minimum of the perceivable deceleration which can be perceived by the operator, the situation where the operator's perception of the stepping of the brake pedal 2 becomes slow can be avoided, without needing a highly-precise adjustment.

Since the local minimum point P is set within the range of the deceleration D higher than the minimum c of the perceivable deceleration D, the vehicle operator can foresee the actual start of the stepping operation of the brake pedal 2 upon the operation accompanied by the negative braking rigidity S, while improving the braking response of the vehicle.

Since the braking rigidity characteristic L4 is the preset braking rigidity characteristic map M3, the reaction-force giving part 6 can be controlled based on the braking rigidity characteristic L4 with the simple configuration.

Next, some modifications in which the above embodiment is partially changed are described.

1) Although in the above embodiment the example of the braking control device with the brake-by-wire system is described, the braking control device may be applied to a common hydraulic braking control device.

2) Although in the above embodiment the example where the deceleration is set based on the stroke and the braking characteristic map is described, a vehicle speed sensor may additionally be provided and the deceleration may be set based on the detected vehicle speed.

3) Although in the above embodiment the example where the local minimum point is set at the deceleration slightly larger than the minimum threshold of the deceleration which is perceivable by the operator is described, the local minimum point may be set at the minimum threshold of the deceleration which is perceivable by the operator, or may be set as a zero deceleration.

4) It should be appreciated that a person skilled in the art may implement variously changed forms of the above embodiment and modifications, or a combination of the above embodiment and/or modifications, without departing from the scope of the present disclosure, and the present disclosure also includes such changes and combinations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Braking Control Device
2 Brake Pedal
5 Braking Hydraulic Pressure Generating Mechanism
6 Reaction-force Giving Part
8 Stroke Sensor
10 ECU (electronic control unit)
St Stroke
D Deceleration
S Braking Rigidity
L4 Braking Rigidity Characteristic
P Local Minimum Point
M3 Braking Rigidity Characteristic Map

What is claimed is:

1. A braking control device for a vehicle, comprising:
a stroke sensor configured to detect an operating amount of a brake pedal;
a stroke simulator configured to generate a reaction-force of the brake pedal;
a braking hydraulic pressure generating mechanism configured to generate a braking force for wheels according to the operating amount of the brake pedal; and
an electronic control unit (ECU) electrically connected with the stroke sensor, the stroke simulator, and the braking hydraulic pressure generating mechanism, the ECU including a processor configured to execute:
a control module to control the stroke simulator and the braking hydraulic pressure generating mechanism; and
a braking rigidity characteristic setting module to set a braking rigidity characteristic based on a braking rigidity that is a ratio of the reaction-force of the brake pedal to the operating amount of the brake pedal, and a target deceleration of the vehicle,
wherein the braking rigidity characteristic setting module sets values of the braking rigidity so that the braking rigidity increases as the target deceleration of the vehicle becomes larger,
wherein the control module controls the stroke simulator based on the braking rigidity characteristic,
wherein the processor is configured to set the target deceleration of the vehicle based on the reaction-force which is set in accordance with a detected brake pedal stroke,
wherein the ECU is further provided with:
a reaction-force characteristic map defining a reaction-force characteristic in which the reaction-force of a vehicle operator operating the brake pedal and a brake pedal stroke are in a logarithmic relationship;
a braking characteristic map defining the target deceleration of the vehicle and a first reaction-force of the vehicle operator operating the brake pedal; and
a braking rigidity characteristic map defining the braking rigidity characteristic based on the target deceleration and the braking rigidity,
wherein the processor sets the reaction-force, which is set according to the detected brake pedal stroke, as the first reaction-force, and uses the first reaction-force and the braking characteristic map to set the target deceleration of the vehicle, and
wherein the processor sets a second reaction-force using the target deceleration, the detected brake pedal stroke, and the braking rigidity characteristic map, and outputs an operation instruction signal to the stroke simulator based on the second reaction-force.

2. The braking control device of claim 1, wherein the braking rigidity characteristic setting module sets a local minimum point of deceleration where the braking rigidity becomes a minimum within a range of near-zero deceleration, and sets the reaction-force so that the braking rigidity decreases as the target deceleration of the vehicle becomes larger when the target deceleration of the vehicle is smaller than the local minimum point of deceleration.

3. The braking control device of claim 2, wherein the braking rigidity characteristic setting module sets the local minimum point within a range near a minimum threshold of a deceleration that is perceivable by the vehicle operator.

4. The braking control device of claim 3, wherein the braking rigidity characteristic setting module sets the values of the braking rigidity based on a map where a correlation between the braking rigidity and the target deceleration of the vehicle is preset.

5. The braking control device of claim 2, wherein the local minimum point is set within a deceleration range higher than a minimum threshold of a deceleration that is perceivable by the vehicle operator.

6. The braking control device of claim 5, wherein the braking rigidity characteristic setting module sets the values of the braking rigidity based on a map where a correlation between the braking rigidity and the target deceleration of the vehicle is preset.

7. The braking control device of claim 2, wherein the braking rigidity characteristic setting module sets the values of the braking rigidity based on a map where a correlation between the braking rigidity and the target deceleration of the vehicle is preset.

8. The braking control device of claim 1, wherein the braking rigidity characteristic setting module sets the values of the braking rigidity based on a map where a correlation between the braking rigidity and the target deceleration of the vehicle is preset.

* * * * *